(12) United States Patent
Fujisawa et al.

(10) Patent No.: US 7,698,447 B2
(45) Date of Patent: Apr. 13, 2010

(54) NETWORK GAME TERMINAL UNIT

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 958 days.

(21) Appl. No.: 10/510,503

(22) PCT Filed: Apr. 7, 2003

(86) PCT No.: PCT/JP03/04444

§ 371 (c)(1),
(2), (4) Date: Oct. 7, 2004

(87) PCT Pub. No.: WO03/085942

PCT Pub. Date: Oct. 16, 2003

(65) Prior Publication Data

US 2005/0246449 A1     Nov. 3, 2005

(30) Foreign Application Priority Data

Apr. 8, 2002    (JP) .............................. 2002-104601

(51) Int. Cl.
*H04M 3/42* (2006.01)
(52) U.S. Cl. .................... 709/230; 370/352; 463/40; 463/43; 709/246
(58) Field of Classification Search ............... 455/566, 455/415, 419, 420, 567, 569; 463/42, 43, 463/35, 38, 39, 41, 40; 379/88.13; 709/228, 709/219, 245, 9, 230, 246; 370/352
See application file for complete search history.

(56) References Cited

U.S. PATENT DOCUMENTS 5,685,775 A * 11/1997 Bakoglu et al. ............... 463/41
5,832,217 A    11/1998 Takahara et al.
6,203,433 B1 *  3/2001 Kume ........................... 463/42
6,241,612 B1 *  6/2001 Heredia ........................ 463/42
6,579,184 B1 *  6/2003 Tanskanen .................... 463/41

(Continued)

FOREIGN PATENT DOCUMENTS

EP          1 097 735         10/2000

OTHER PUBLICATIONS

Patent Abstracts of Japan, Publication No. 2001-314657, Publication Date: Nov. 13, 2001; Applicant: Sega Corp.

*Primary Examiner*—Gerald Gauthier
(74) *Attorney, Agent, or Firm*—Manabu Kanesaka

(57) ABSTRACT

In a network game in which a number of players participate, multiple players can communicate each other by the user of an IP telephone or an Internet telephone network. A voice receiving section of the terminal unit 12 comprises a game communicating section 51 connected to a game server via the network, a participant IP managing section 53 for managing IP addresses of game participants connected online to the network, a network receiving section 54 for receiving telephone message data and musical sound data via the network, a sorting section 55 for determining whether received telephone message data includes a prespecified IP address or not and sending a result of determination to a following extending section 56, the extending section 56 for restoring the transmitted telephone message data and musical sound data, a synthesizing section 57 for synthesizing the restored telephone message data and musical sound data in the time-series mode, and a microphone/speaker I/F section 59 as a connecting section to a microphone/speaker or other analog equipment.

7 Claims, 5 Drawing Sheets

U.S. PATENT DOCUMENTS

| | | | | |
|---|---|---|---|---|
| 6,629,893 | B1 * | 10/2003 | Funatsu et al. | 463/43 |
| 6,782,281 | B1 * | 8/2004 | Nagasawa | 455/575.3 |
| 6,893,347 | B1 * | 5/2005 | Zilliacus et al. | 463/41 |
| 6,931,117 | B2 * | 8/2005 | Roberts et al. | 379/215.01 |
| 7,023,421 | B2 * | 4/2006 | Wong et al. | 345/156 |
| 7,069,044 | B2 * | 6/2006 | Okada et al. | 455/556.1 |
| 7,240,093 | B1 * | 7/2007 | Danieli et al. | 709/205 |
| 7,278,921 | B1 * | 10/2007 | Fujisawa et al. | 463/42 |
| 7,431,651 | B2 * | 10/2008 | Yamana et al. | 463/42 |
| 2001/0016519 | A1 | 8/2001 | Choe | |
| 2001/0018365 | A1 * | 8/2001 | Orui et al. | 463/40 |
| 2001/0039210 | A1 * | 11/2001 | St-Denis | 463/42 |
| 2001/0053691 | A1 * | 12/2001 | Harma | 455/419 |
| 2002/0035467 | A1 * | 3/2002 | Morimoto et al. | 704/9 |
| 2002/0119821 | A1 * | 8/2002 | Sen et al. | 463/42 |
| 2002/0173301 | A1 * | 11/2002 | Ikeda | 455/419 |
| 2008/0161111 | A1 * | 7/2008 | Schuman | 463/41 |
| 2009/0106394 | A1 * | 4/2009 | Lin et al. | 709/218 |

* cited by examiner

NETWORK GAME TERMINAL UNIT

FIELD OF THE INVENTION

The present invention relates to a network game terminal unit for a network game in which a number of players (sometimes described as participants hereinafter) can communicate with each other (sometimes described as an online game hereinafter).

BACKGROUND TECHNOLOGY

Recently they online game developed on a network for enabling various types of games such as a role playing game (RPG) or a match-up game has been becoming more and more popular. In this type of online game, for the purpose to improve the attractiveness or value, for instance, in a network game fought between a group of combat planes and another group of combat planes, communications with comrade planes or with enemy planes are performed, and as a communication tool for that purpose, a chat system or a general telephone line is used for conversations.

In the case of conversations based on the chat system, in addition to operations for playing the game, however, entry of characters from a keyboard is required, so that the operations are complicated and troublesome, and further the response is rather slow, and sometimes the game can not progress smoothly. Further in the case of conversation over the general telephone line or the like, excessive economical burden is compelled to the players because of the current telephone rate system, so that these communication tools are not suited for a game requiring a long period of time to play. Although conversations among a plurality of participants are possible even now over the general telephone line, it is impossible to freely and temporally switch the communication mode to, for instance, person to person communication mode or person to multiple persons communication mode during multiple persons to multiple persons communication mode.

Japanese Patent Laid-Open Publication No. 2001-314657 discloses a network game system comprising a voice exchange means such as the Internet telephone or the like available between two persons, one as a navigator and the other as a player, and in this system voices are subjected to acoustic effects to introduce reality into the game. However, the technology disclosed in the publication is limited to person to person telephone communications, and the technology can not enable communications among multiple persons as that required in the match-up game. In addition, the acoustic effects are only application of acoustic pressure and tone control to voices of a telephone message, and therefore the technology is not sufficient for substantially improving realistic sensations or reality of a game.

DISCLOSURE OF THE INVENTION

An object of the present invention is to provide a method for enabling a network game in which a number of players participate and also in which the multiple players can communicate each other by the user of an IP telephone or an Internet telephone network, a network game terminal and a game server for the same.

The present invention provides a method for enabling a network game in which a number of players participate by using a terminal device having a communication tool over the IP telephone, and the method according to the present invention enables concurrent communications among multiple players by managing an IP address of each player and selectively receiving a telephone message signal including a predetermined IP address.

In the method for enabling a network game, it is preferable to receive, in addition to the telephone message signal, a musical sound signal comprising game effect sound data and game message data with the communication tool.

In the network game terminal unit having a communication tool over an IP telephone according to the present invention, a voice receiving section of the terminal unit comprises a game communication section for transmitting and receiving a program signal for controlling a network game; a game control section for controlling a participant IP managing section, a sorting section and a synthesizing section each described hereinafter based on the signal; a participant IP managing section for managing IP addresses of online game participants; a network receiving section for receiving telephone message data; a sorting section for determining whether the received telephone message data includes a predetermined IP address or not and transmitting the telephone message data to an extending section described below; an extending section for restoring the transmitted telephone message data; a synthesizing section for synthesizing the restored telephone message data as a function of time; a D/A converting section for converting digital signals for the synthesized telephone message data to analog signals; and a microphone/speaker I/F section for connecting to the communication tool.

The network receiving section preferably receives musical sound data for the network game together with the telephone message data.

The voice receiving section of the terminal unit further preferably comprises an in-coming call transmitting section for transmitting in-coming call notifying sounds previously accumulated therein to the synthesizing section in response to an instruction by the sorting section.

A network game server according to the present invention has a network game executing section, which comprises a data accumulating section for accumulating data for network games; a game processing section for managing, processing, and making determination as to signal transaction of the various types of data according to progression of the network game; a match-up managing section for managing each match of a game; and a game communicating section for transacting control program signals for the network game with a network terminal unit, and the network game server has a function to fetch an IP address of a terminal unit connected to the network and to notify the IP address to other terminal units.

The data accumulating section further accumulates therein, in addition to image data, effect sound data and message data, and the network game executing section further preferably comprises a communication processing section for transmitting musical sound data containing the effect sound data and the message data upon a request from the game processing section; a control section for controlling the communication processing section and the game processing section; and a network transmitting section for transmitting the musical sound data to the network terminal unit.

BEST MODE FOR CARRYING OUT THE INVENTION

A method for enabling a network game according to the present invention is described with reference to an embodiment of a match-up game in which a number of players participate.

Figure 1:
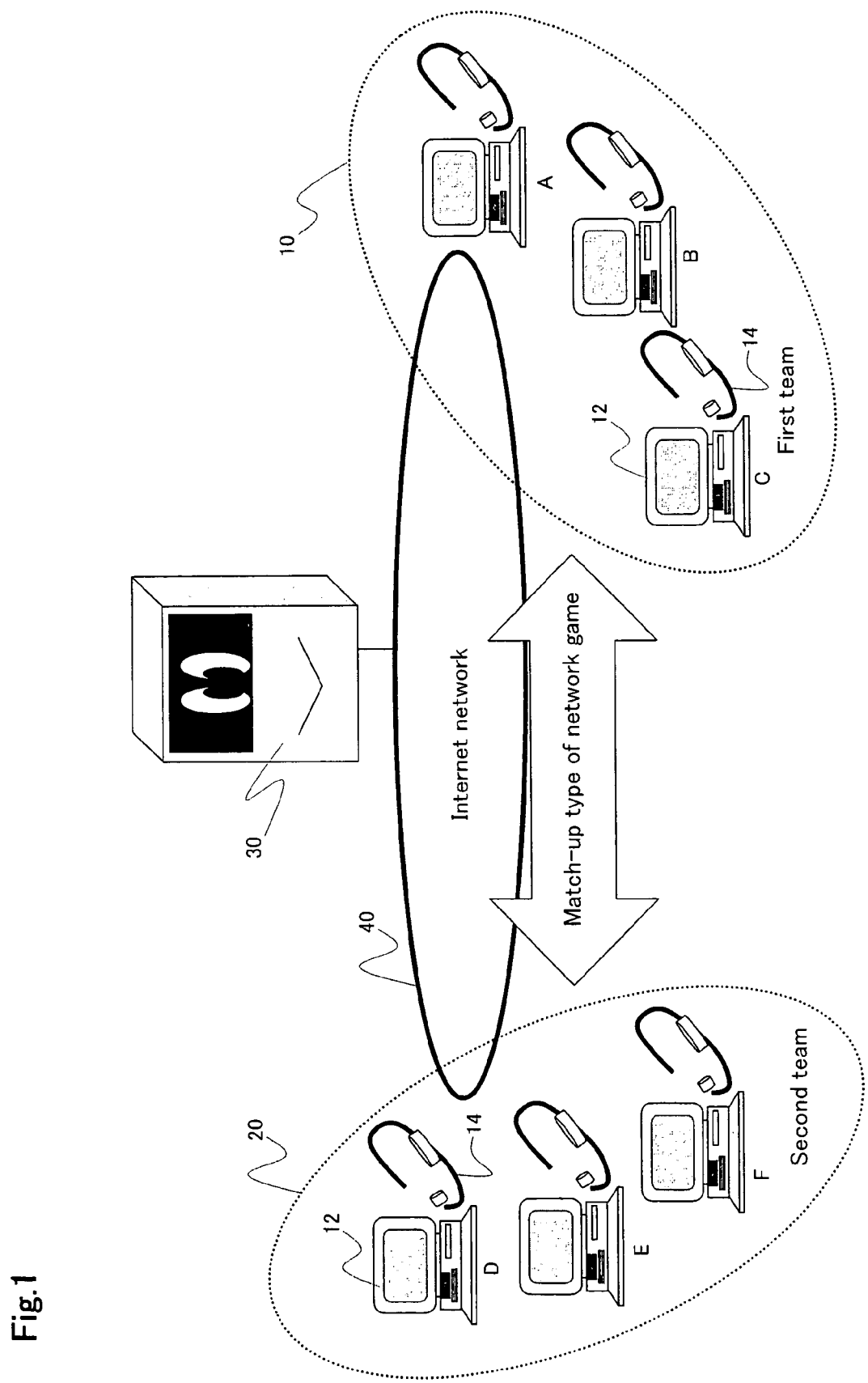
FIG. 1 is a general block diagram showing a network game enabling method according to the present invention.

FIG. 1 is a general block diagram showing the invention as a whole, and the figure shows a case in which a first team 10 consisting of participants A, B, C and a second team 20 consisting of participants D, E, F participate in a match-up type of online game. Terminal units 12, 12, . . . operated by the participants A to F and a managing server 30 providing the network game service are connected to Internet network 40 respectively.

Provided in each of the terminal units 12, 12, . . . operated by the participants A to F is a communication tool 14, and in the present invention, communication over the IP telephone is carried out with the terminal unit 12 having the communication tool 14. In the present invention, the IP telephone is defined as a system for sending and receiving digitalized voice data over the Internet network 40, and includes the Internet telephone for sending and receiving voice data through the public Internet network. With the system according to the present invention described hereinafter, the players A to F, which are participants in a network, can make communications not only among multiple persons and between one person and multiple persons over the Internet telephone, but also can make person to person communication, if necessary. Namely, simultaneous communications among players can freely be switched to a communication mode between one person and multiple persons, or to the person to person communication mode by providing controls from a game screen.

Various methods may be employed to decide a participant in a network game, and for instance, a counter partner for the match-up game or the participant as a team member can be decided by the use of the method as disclosed, in, for instance, Japanese Patent Laid-Open Publication No. HEI 11-253657 or International Patent Publication Bulletin WO 01/27771.

Figure 2:
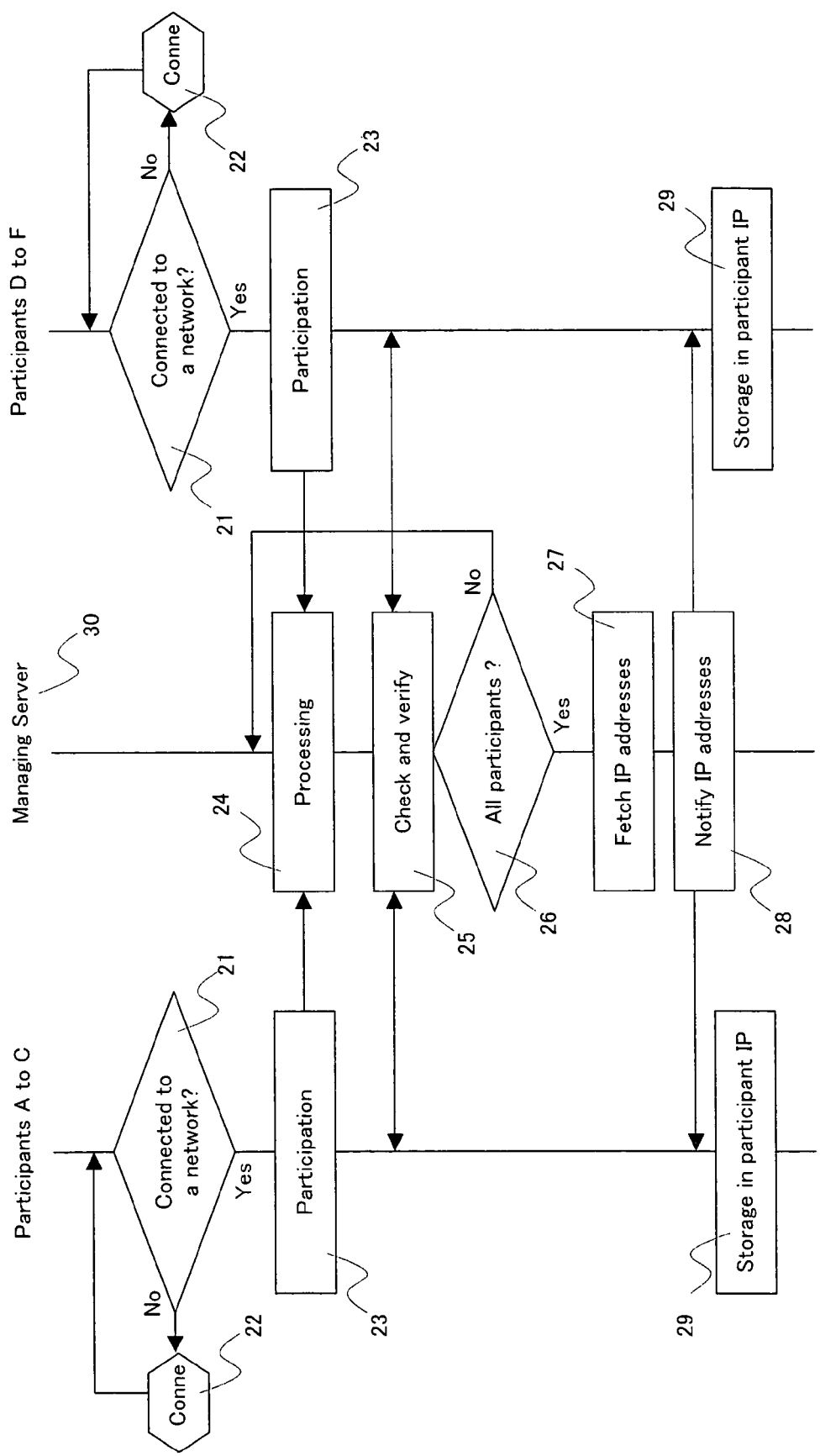
FIG. 2 is a flow chart showing an example of the processing for registration of participation in a network game.

FIG. 2 is a flow chart showing the processing for registering a participant in a network game, and in this figure, the processing procedure in the managing server 30 providing a network game service is shown at the center, and the processing procedures for registering the players A to C in the first team 10 and the players D to F in the second team 20 are shown in the right and left sides thereof. The processing procedure for registering the players A to C in the first team 10 is the same as that for registering the players D to F in the second team 20.

Each of the players A to F checks whether the terminal unit 12 is connected online to a network or not (21), and when it is determined that the terminal unit 12 is still offline to the network, the player connects the terminal unit 21 to the network by performing prespecified operations (22). After each of the players A to F has made the prespecified procedure for participating in the network game (23), the managing server 30 recognizes the registration by each player for each match-up game and executes the processing for acknowledging the players prespecified for the network game (24). Namely, the managing server 30 checks and verifies the players A to F person by person (25), and determines whether a required number of players have been registered or not (26). When it is determined that all of the required players have registered in the network game, the managing server 30 fetches IP addresses of all of the players (27), and notifies (28) each of the players A to F of the IP addresses of all players and that of the managing server. The IP addresses are stored (29) in a participant IP managing section 53 provided in the terminal unit 12 for each of the players A to F described hereinafter. Alternatively, the IP addresses of the players may be fetched during any of the processing procedure (23) by each of the players A to F to participate in the network game, the processing procedure (24) for acknowledging the participants by the managing server 30, or in any other step.

Figure 3:
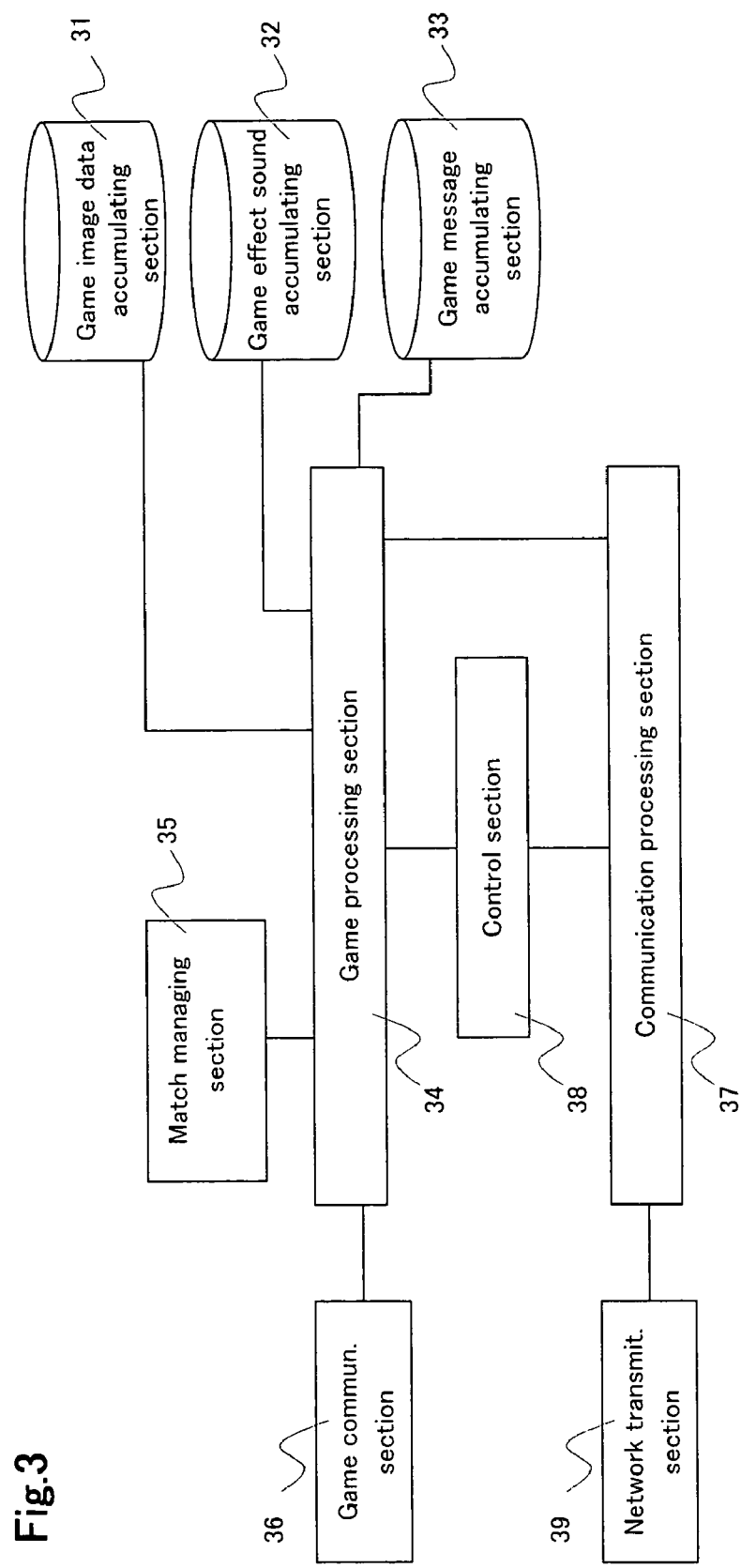
FIG. 3 is a block diagram showing a network game executing section in a managing server.

Next the managing server 30 providing a network game is described. FIG. 3 is a block diagram showing a network game executing section in the managing server 30, and the executing section comprises a game image data accumulating section 31 for accumulating data of a network game, a game effect sound data accumulating section 32, a game message data accumulating section 33, a game processing section 34 for managing, processing, and making determinations for transaction of various data described above in response to progress of a network game, a match-up game managing section 35 for managing a game match by match, a game communicating section 36 for sending and receiving program signals for controlling the network game to and from the terminal unit 12 for each player, and in addition, a communication processing section 37 for sending voices (musical sounds) in response to a request from the game processing section 34, a control section 38 for controlling the game processing section 34 and the communication processing section 37, and a network transmitting section 39 which is a so-called transmitting section for the IP telephone.

Accumulated in the game image data accumulating section 31 described above is also character data such as superimposition and telop for a network game separated from the images. The data and audio signals as ordinary game sounds are transmitted from the game communicating section 36 to a receiving section for each game program (not shown) in the terminal unit 12 together with image data for the game according to the method similar to that employed in the known network game server. On the other hand, game effect sound data such as voices, music, and sounds for a network game and game message data such as game messages generated from devices and instruments during a game (generically described as musical sound data hereinafter) are transmitted from the network transmitting section 39 to a network receiving section 54 on the terminal unit 12 described later when the control section 38 issues an instruction for preparation for extraction and transmission of required musical sound data to the communication processing section 37 upon a request from the game processing section 34 having referred to the matchup game managing section 35.

Figure 4:
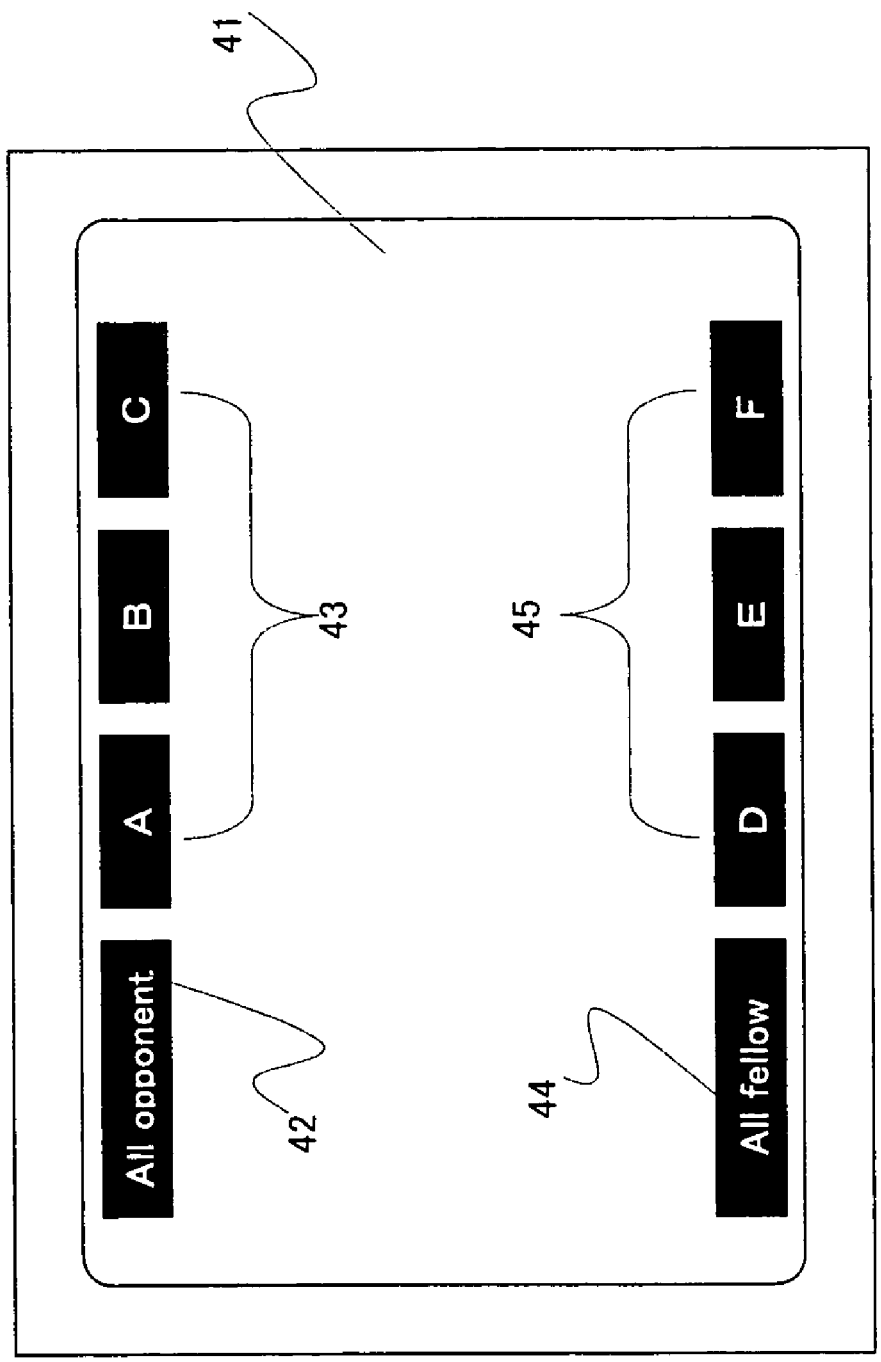
FIG. 4 is a view showing an example of a screen displayed on a terminal unit in the transmitting player side when the player sends a call during an online game to another player.

FIG. 4 is a view showing a terminal screen on the terminal unit 12 for a player, namely an example of a screen displayed on the terminal unit 12 for a player in the transmitting side when the player transmits a telephone message to another player connected online to the network. The game image is not shown. Provided along an upper edge of a display screen 41 are a group of connection buttons 42 (for all players as counter partners in a game) used for transmitting messages to the first team (a counter partner in the game), and a group of connection buttons 43 (for each player as a counter partner in the game), and also provided along a lower edge thereof are a group of connection buttons 44 (for all fellow players) and a group of connection buttons 45 (for each fellow player). Further a button for allowing transmission of a message from one player in the transmitting side to a plurality of specified players or transmission of a message from one player to all opponent players may be provided.

When a player in the transmitting side selects (by clicking a mouse thereon or by key entry) any of the connection buttons 42 to 45 displayed on the terminal screen, desired telephone message data is transmitted to a desired player in the receiving side (a counter partner in the game).

Next the terminal unit 12 for a player with the communication tool 14 connected thereto is described.

Figure 5:
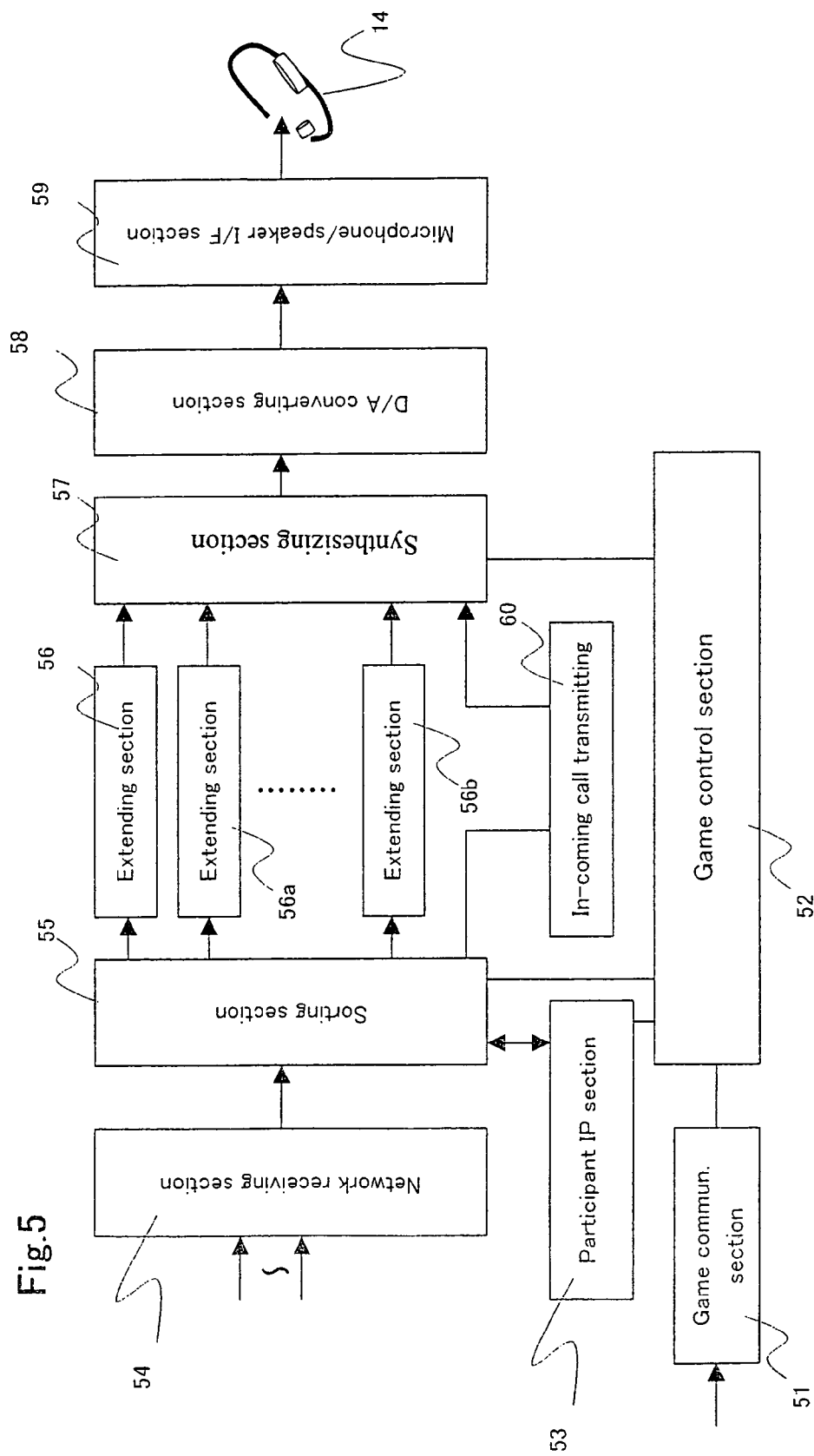
FIG. 5 is a block diagram showing configuration of a voice receiving section of a network game terminal unit.

FIG. 5 is a block diagram showing configuration of a voice receiving section of the terminal unit 12, and the receiving section is connected to the game communicating section 36 of the managing server 30 via the Internet network 40. The receiving section comprises a game communicating section 51 for sending and receiving program signals for controlling a network game, a game control section 52 for controlling the entire voice receiving section based on the signals, a participant IP managing section 53 for managing IP addresses of game participants connected online to the network, a network receiving section 54 for receiving telephone message data and musical sound data via the Internet network 40, a sorting section 55 for determining whether received telephone message data includes a prespecified IP address or not and sending a result of determination to a following extending section 56, the extending section 56 for restoring the transmitted telephone message data and musical sound data, a synthesizing section 57 for synthesizing the restored telephone message data and musical sound data in the time-series mode, a D/A converting section 58 for converting digital signals for the synthesized telephone message data and musical sound data to analog signals, a microphone/speaker I/F section 59 as a connecting section to a microphone/speaker or other analog equipment, and an in-coming call transmitting section 60 for accumulating therein in-coming call alerting voices (such as voices or electronic sounds) previously prepared and transmitting the sounds to the synthesizing section 57 according to an instruction by the sorting section 55.

In FIG. 5, the IP address data transmitted from the game communicating section 36 of the managing server 30 is received by the game communicating section 51, and is stored in the participant IP managing section 53 according to an instruction by the game control section 52.

In the game terminal unit 12 connected to a network, telephone message signals transmitted from other player are received by the network receiving section 54 and are delivered to the sorting section 55. The sorting section 55 determines whether the signals are those each including an IP address registered in the participant IP managing section 53 or not, and when it is determined that the signals include registered IP addresses respectively, the sorting section 55 delivers the signals to the extending section 56. It is desirable that a plurality of extending sections 56a, 56b, ... are provided for a plurality of in-coming signals to cope with a trouble such as a delay. The digital signals normalized in the extending section 56 are then transmitted to the synthesizing section 57 and are synthesized in succession in the time-series mode. To accurately synthesize the digital signals in the time-series mode, it is desirable that each of the in-coming signals has a time stamp.

Then the synthesized digital signals are subjected to digital to analog conversion in the D/A converting section 58, and are outputted to a speaker of the communication tool 14 via the microphone/speaker I/F section 59. Synthesis in the synthesizing section 57 may be either digital synthesis or analog synthesis, and when analog synthesis is to be carried out, the positional relation between the synthesizing section 57 and the D/A converting section 58 is contrary to that shown in FIG. 5.

In the synthesizing section 57, synthesis of telephone message data transmitted from the other player and also synthesis of musical sound data (such as game effect sounds or game messages) transmitted from the managing server 30 according to a type of a network game or to other necessities are carried out. Namely, also a signal including musical sound data transmitted from the network transmitting section 39 of the managing server 30 is received by the network receiving section 54 and is delivered, like the telephone message signal from a player, to the sorting section 55, and is outputted to a speaker of the communication tool 14 after having been subjected to synthesis in the synthesizing section 57.

In the step of determination by the sorting section 55 described above, when it is determined that the in-coming signal does not include a registered IP address, the signal is aborted, or an instruction for transmission of a dial tone to the incoming call transmitting section 60 is issued, and the dial tone is transmitted to the synthesizing section 57. When the dial tone is outputted to the speaker, a player having received the dial tone can sense a call even from a person not participating in the game.

In other words, in the present invention, it is possible to provide also telephone message data transmitted from a person not participating in a game as an in-coming call sound on service, if required.

Further it is also possible to abort an in-coming signal from a specified person or all incoming signals in response to an instruction from the game control section 52 according to progress of a game. The control signal for this type of musical sound data is transmitted from the game communicating section 36 under control by the game processing section 34 in the managing server 30 according to progress of each game, and is received by the game communicating section 51 in the game terminal unit 12. The processing by the game control section 52 is especially effective, for instance, when any person cancels participation in or quits from the game in a matchup game.

The method for enabling a network game according to the present invention enables not only concurrent telephone communications among three or more participants in a network game, but volume adjustment of game effect sounds and game messages to provide reality or realistic sensations in communications among players, so that the effects in improving a completion of a network game and satisfaction of players are quite large.

Further an in-coming call from a person other than players can be sensed during a network game, and therefore the present invention can provide the remarkable advantage of being capable dissolving the uneasiness caused by long time occupation by a game in the Internet telephone or the IP telephone which would be a mainstream in the future communications.

The invention claimed is:

1. A combination comprising a network game server and a network game terminal unit, wherein said network game server comprises a network game executing section for controlling a network game, and said network game terminal unit comprises a communication tool enabling an Internet Protocol telephone and a voice receiving section, said voice receiving section comprising:

a game communicating section, connected to the network game server, for sending and receiving program signals for controlling a network game;

a game control section, connected to the game communicating section, for controlling the network game based on the program signals;

a participant Internet Protocol managing section for managing Internet Protocol addresses of participants in the game being provided, said participant Internet Protocol managing section being controlled by the game control section;

a network receiving section, separated from the game communicating section, for receiving signals from the network game server, and directly receiving a plurality of incoming signals of telephone message data from other game terminal unit without transmitting through the network game server;

a sorting section for determining whether the received telephone message data includes a prespecified Internet Protocol address or not, and sending a plurality of the incoming signals of the telephone message data sequentially, said sorting section being controlled by the game control section;

a plurality of extending sections corresponding to the incoming signals, said plurality of extending sections receiving the plurality of the incoming signals from the sorting section and restoring the transmitted telephone message data;

a synthesizing section for synthesizing the plurality of the incoming signals of the restored telephone message data in the time-series mode, said synthesizing section being controlled by the game control section;

a digital and analog converting section for converting a digital signal in the synthesized telephone message data to an analog signal; and a microphone and speaker Interface section as a connecting section to the communication tool, wherein a plurality of players participates by terminal units each having the communication tool enabling the Internet Protocol telephone, and communicates directly among the players without transmitting through the game server by controlling Internet Protocol addresses of the players and selectively receiving a telephone message signal including a specific Internet Protocol address.

2. The combination according to claim 1, wherein the network receiving section receives musical sound data for the network game together with the telephone message data.

3. The combination according to claim 2, wherein the voice receiving section in the terminal unit further comprises an incoming call transmitting section for sending an incoming call dial tone previously accumulated therein to the synthesizing section in response to an instruction from the sorting section.

4. The combination according to claim 3, wherein when the sorting section determines that the received telephone message data does not include the prespecified IP address, the telephone message data is aborted or an instruction for transmission of a dial tone to the in-coming call transmitting section.

5. The combination according to claim 2, wherein said synthesizing section synthesizes the telephone message data transmitted from other players and the musical sound data transmitted from a managing server and transferred to the player.

6. The combination according to claim 4, further comprising means for selectively communicating with the plurality of players including one to one and one to all the players.

7. The combination according to claim 1, wherein the network game server further comprises means for fetching an IP address of a terminal unit connected to the network and for notifying other terminal units of this IP address.

* * * * *